United States Patent Office 2,965,579
Patented Dec. 20, 1960

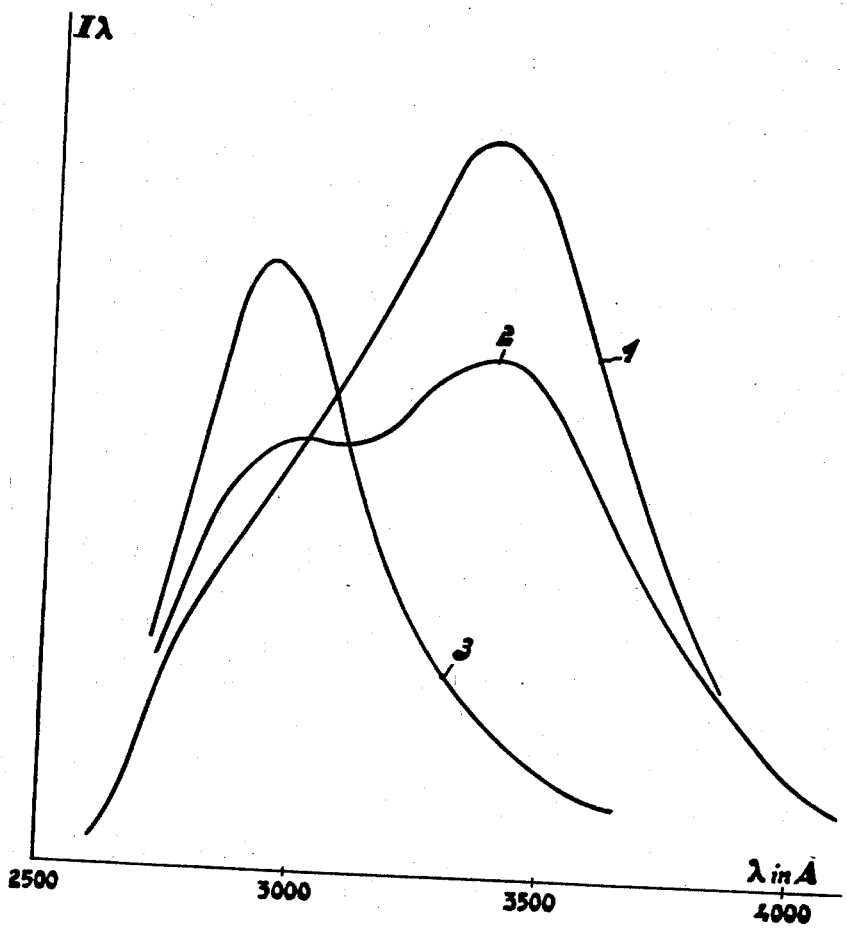

2,965,579
METHOD OF PRODUCING ULTRA-VIOLET LUMINESCING SILICATES

Anna Petronella Maria Cox, Age Hylke Hoekstra, and Hendrik Anne Klasens, Eindhoven, Netherlands, assignors, by mesne assignments, to North American Philips Company, Inc., New York, N.Y., a corporation of Delaware Filed May 8, 1956, Ser. No. 583,458
Claims priority, application Netherlands May 10, 1955
9 Claims. (Cl. 252—301.6)

Our invention relates to methods of producing silicates which, under the action of a radiation which is produced in a gas-and/or vapour-discharge tube, emit ultra-violet rays with a maximum emission between 2800 A. and 3500 A. and to silicates produced by these methods.

Luminescent substances have been produced which when activated by the radiation produced in a gas and-or vapour-discharge tube emit rays whose maximum emission falls in the port of the spectrum situated between 2800 A. and 4000 A. However the efficiency of the emissions of these known substances in this range has not been satisfactory. Further, the increased importance of this part of the spectrum particularly for medical use, blueprinting and advertising signs, has resulted in a need for an increased number of these luminescent materials.

A principal object of our invention therefore, is to provide novel luminescent materials which when activated by the radiation produced by a gas and/or vapour-discharge tube emit rays whose maximum falls in the part of the spectrum situated between 2800 A. and 4000 A.

A second principal object of our invention is to provide a method for producing novel luminescent materials which, with increased efficiency, emit rays whose maximum falls in the part if the spectrum situated between 2800 A. and 4000 A. These and other objects of our invention will become apparent from the description that follows.

According to our invention we produce a luminescent silicate which when activated by the radiation produced in a gas and/or vapour-discharge tube emits ultra-violet radiation having a maximum emission between 2800 A. and 3500 A. by heating in an oxidizing atmosphere a mixture of compounds of calcium, magnesium, lead and silicon which on heating produces a lead activated silicate. More particularly according to our invention we produce a lead activated silicate by heating for a few hours, in an oxidizing atmosphere, at a temperature of from about 900° C. to 1200° C. a mixture of compounds of calcium, lead, magnesium and silicon in which the atomic ratios of the elements in the mixture satisfy the following conditions:

$\dfrac{Ca}{Ca+Mg+Si}$ lies between 0.05 and 0.45

$\dfrac{Mg}{Ca+Mg+Si}$ lies between 0.05 and 0.60

$\dfrac{Si}{Ca+Mg+Si}$ lies between 0.35 and 0.90, and $\dfrac{Pb}{Ca+Mg+Si}$ lies between 0.0003 and 0.1.

While products of high efficiency are obtained from a mixture in which the atomic ratios of the elements satisfy the above stated conditions products of even higher efficiency are obtained if the atomic ratios of the elements in the mixture satisfy the following conditions:

$\dfrac{Ca}{Ca+Mg+Si}$ lies between 0.075 and 0.40, $\dfrac{Mg}{Ca+Mg+Si}$ lies between 0.075 and 0.525, $\dfrac{Si}{Ca+Mg+Si}$ lies between 0.40 and 0.70, $\dfrac{Pb}{Ca+Mg+Si}$ lies between 0.004 and 0.04.

In the mixtures used in forming the silicates of our invention up to 80 mol percent of the magnesium may be replaced by zinc without perceptibly affecting the efficiency of the conversion and maximum emission of the luminescent materials of our invention.

In addition up to 80 mol percent of the calcium may be replaced by barium. This substitution permits the shifting of the emission maximum towards shorter wavelengths.

Among the suitable compounds for preparing the mixtures of our method are the oxides, nitrates and carbonates of calcium, barium, zinc, magnesium and lead.

It is preferred to add the silicon as an oxide.

If a flux is desired, use may be made of the fluorides of the alkaline earth metals and of lead. The incorporation of such flux materials reduces the temperatures required to form the luminescent silicates of our invention and acts to promote crystallization. However, the amount of the fluoride in mols should not exceed 1/10 of the sum total of the calcium, magnesium and silicon compounds.

The substance produced by the method of our invention is very suitable for use in combination with a low-pressure mercury-vapour discharge tube, since the discharge of such a tube emits a high amount of radiation of a wave length of 2537 A., which thus can be converted, with satisfactory efficiency, into a radiation having a maximum emission between 2800 A. and 3500 A. Such a substance may be coated as a layer on the inner wall of the envelope of this discharge tube. However, the substance may alternatively be arranged outside the discharge tube, for example, on a reflector in which case the exciting radiation must pass through the envelope of the discharge tube, i.e., the envelope should be quartz.

A few examples of production methods are given hereinafter with reference to the drawing, in which the emission curves of the substances produced by the methods described in the examples are shown. In the graph, the wave length in Angstrom units is plotted as the abscissa and the intensity of the radiation is plotted as the ordinate. However, the scale of intensity is different from the different curves.

*Examples*

(1) 35.0 gms. of $CaCO_3$     28.1 gms. of $SiO_2$
    9.0 gms. of MgO are mixed in a mortar. This mixture is diluted in a beaker with a small amount of alcohol to form a paste and is wetted with 25 millilitres of a solution of $Pb(NO_3)_2$ containing $10^{-4}$ gram molecule per millilitre. The mixture is thoroughly agitated and subsequently dried by evaporation at about 100° C. The dry powder is again mixed in a mortar and subsequently heated in an Alundum crucible for 2 hours to a temperature of 800° C. in air. The substance thus produced is ground up in a mortar and again heated for 2 hours in an Alundum crucible to a temperature of 1150° C. in air. The resultant product is cooled in the crucible.

On being excited by a radiation of 2537 A. the resultant substance shows a spectral distribution curve as designated 1 in the drawing.

(2) 20.0 g. CaCO₃  37.4 g. SiO₂
    0.8 g. CaF₂    12.2 g. PbF₂
    17.4 g. MgCO₃ are mixed. The mixture is thoroughly ground up in a mortar and transferred to an Alundum crucible. This crucible is heated for 2 hours to a temperature of about 850° C. in air. The substance produced is again thoroughly mixed in a mortar and subsequently heated in an Alundum crucible for 2 hours to a temperature of 100° C. in air. The product produced is left to cool in the crucible.

On excitation by a radiation of 2537 A., this product exhibits a spectral distribution curve which is designated 2 in the figure.

(3) 35.4 g. Ca(NO₃)₂.4H₂O   17.4 g. MgCO₃
    29.6 g. BaCO₃            28.1 g. SiO₂ are mixed in a mortar. The mixture produced is diluted in a beaker with a slight amount of alcohol and 25 millilitres of a solution of Pb(NO₃)₂ containing 10⁻⁴ gram molecules per millilitre. The mixture is thoroughly stirred and subsequently dried by evaporation at about 100° C. The dry powder is again thoroughly mixed in a mortar and subsequently heated in an Alundum crucible for 2 hours to a temperature of 850° C. in air. The substance produced is ground up in a mortar and again heated for 2 hours in an Alundum crucible to a temperature of 1100° C. in air. The resultant product is left to cool in the crucible.

On excitation of this substance by a radiation of 2537 A. a special distribution curve is obtained which is designated 3 in the drawing.

(4) 28.0 g. CaCO₃   6.7 g. MgO
    13.8 g. BaCO₃   31.2 g. SiO₂ are mixed. The mixture is thoroughly ground up in a mortar and then transferred to a beaker. In the beaker it is wetted with some alcohol and 50 millilitres of a solution of Pb(NO₃)₂ containing 10⁻⁴ gram-molecules per millilitre. The mixture is thoroughly stirred and then dried by evaporation at a temperature of about 100° C. When the powder is dry, it is again thoroughly mixed in a mortar, transferred to an Alundum crucible and subsequently heated therein for 2 hours to a temperature of 800° C. in air. The product obtained is ground up in a mortar and again heated in an Alundum crucible for 2 hours to a temperature of 1050° C. in air. The resultant product is then left to cool in the crucible.

On excitation by a radiation of 2537 A., the substance produced exhibits a spectral distribution curve which substantially coincides with the curve of 2 of the drawing.

(5) 35.0 g. CaCO₃   8.1 g. ZnO
    4.5 g. MgO      28.1 g. SiO₂ are mixed. The mixture is stirred in a beaker with some alcohol to form a paste. Subsequently 25 millilitres of a solution of Pb(NO₃)₂ containing 10⁻⁴ gram-molecules per millilitre are added. The mixture is dried by evaporation thoroughly mixed in a mortar and heated in an Alundum crucible for 2 hours to 850° C. in air. The fired product is ground up in a mortar and subsequently heated again in air for 2 hours to a temperature of 1050° C. Then the preparate is left to cool in the crucible.

On excitation by a radiation of 2537 A., this product exhibits a spectral distribution curve which substantially coincides with the curve 1 of the drawing.

The luminescent substances produced by any of the above-described methods can be applied in the normal known manners as a luminescent layer in or upon a discharge tube or on a reflector.

While we have described our invention in connection with specific embodiments and applications, other modifications thereof will be readily apparent to those skilled in this art without departing from the spirit and scope of the invention as defined in the appended claims.

What is claimed is:
1. A method of producing a luminescent lead-activated silicate which exhibits a maximum emission of ultra-violet radiation between 2800 A. and 3500 A. comprising forming a mixture of compounds of calcium, magnesium, silicon and lead selected from the group consisting of oxides, nitrates and carbonates in which the atomic ratios of the elements in the mixture fall within the following range:

$$\frac{Ca}{Ca+Mg+Si} \text{ lies between 0.05 and 0.45}$$

$$\frac{Mg}{Ca+Mg+Si} \text{ lies between 0.05 and 0.60}$$

$$\frac{Si}{Ca+Mg+Si} \text{ lies between 0.35 and 0.90, and}$$

$$\frac{Pb}{Ca+Mg+Si} \text{ lies between 0.0003 and 0.1.}$$

and heating said mixture in an oxidizing atmosphere at a temperature between about 900° C. and 1200° C.

2. A method of producing a luminescent lead-activated silicate which exhibits a maximum emission of ultra-violet radiation between 2800 A. and 3500 A. comprising forming a mixture of compounds of calcium, magnesium, silicon and lead selected from the group consisting of oxides, nitrates and carbonates in which the atomic ratios of the elements in the mixture fall within the following range:

$$\frac{Ca}{Ca+Mg+Si} \text{ lies between 0.075 and 0.40,}$$

$$\frac{Mg}{Ca+Mg+Si} \text{ lies between 0.075 and 0.525,}$$

$$\frac{Si}{Ca+Mg+Si} \text{ lies between 0.40 and 0.70,}$$

$$\frac{Pb}{Ca+Mg+Si} \text{ lies between 0.004 and 0.04.}$$

and heating said mixture in an oxidizing atmosphere at a temperature between about 900° C. and 1200° C.

3. The method of claim 1 in which up to 80 mol percent of the magnesium is replaced by zinc.

4. The method of claim 1 in which up to 80 mol percent of the calcium is replaced by barium.

5. The method of claim 1 in which at least one of the compounds is an oxide.

6. The method of claim 1 in which at least one of the compounds used is a nitrate.

7. The method of claim 1 in which at least one of the compounds used is a carbonate.

8. The method of claim 1 further characterized in that the reaction mixture contains in addition as a flux at least one salt selected from the group consisting of the alkaline earth metal fluorides and lead fluoride in an amount in moles less than 1/10 of the sum total of the magnesium, calcium and silicon compounds.

9. An ultra-violet luminescent, lead-activated silicate produced by the method of claim 1.

References Cited in the file of this patent
UNITED STATES PATENTS

| | | |
|---|---|---|
| 2,467,810 | Cassanos | Apr. 19, 1949 |
| 2,577,161 | Smith | Dec. 4, 1951 |
| 2,597,631 | Froelich | May 20, 1952 |
| 2,628,944 | Nagy | Feb. 17, 1953 |

FOREIGN PATENTS

| | | |
|---|---|---|
| 572,771 | Great Britain | Feb. 4, 1943 |

OTHER REFERENCES

"Calcium—Zinc Silicate Phosphors" by Nagy et al April 1952, Jour. of Electrochemical Soc., pp. 137–139.

UNITED STATES PATENT OFFICE
CERTIFICATION OF CORRECTION

Patent No. 2,965,579                  December 20, 1960

Anna Petronella Maria Cox et al.

It is hereby certified that error appears in the above numbered patent requiring correction and that the said Letters Patent should read as corrected below.

Column 1, line 55 for "0 45" read -- 0.45 --.

Signed and sealed this 6th day of June 1961.

(SEAL)
Attest:

ERNEST W. SWIDER                  DAVID L. LADD
Attesting Officer                      Commissioner of Patents